Figure 1:
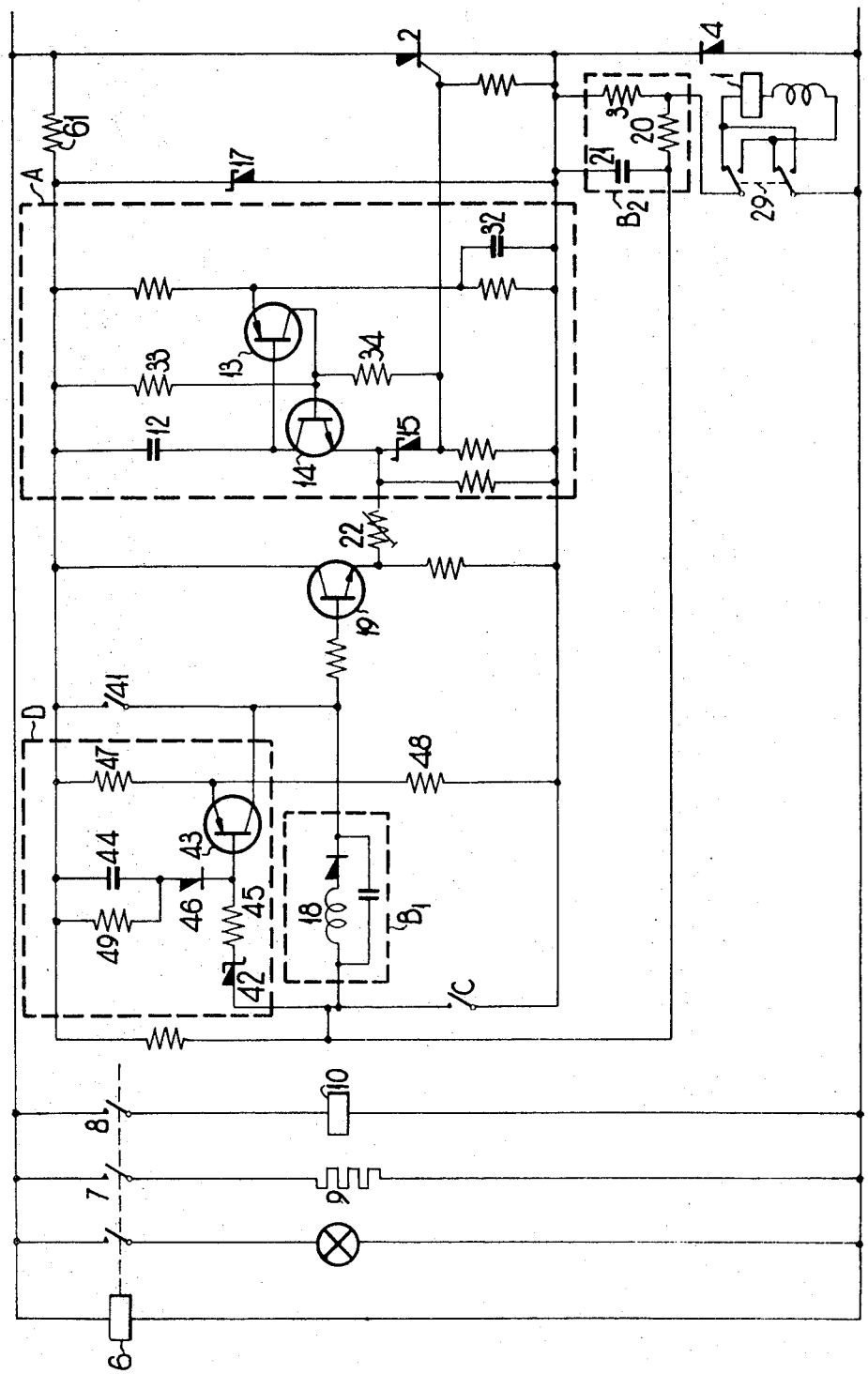

United States Patent

[11] 3,622,853

[72] Inventor Martin Harold Eastall
  Peterborough, England
[21] Appl. No. 861,716
[22] Filed Sept. 29, 1969
[45] Patented Nov. 23, 1971
[73] Assignee British Domestic Appliances Limited
  Peterborough, England
[32] Priority Sept. 30, 1968
[33] Great Britain
[31] 46,325/68

[54] CONTROL CIRCUITS FOR CLOTHES WASHING AND SPIN-DRYING MACHINES
8 Claims, 2 Drawing Figs.

[52] U.S. Cl. ................................................ 318/341, 318/327
[51] Int. Cl. ................................................ H02p 5/16
[50] Field of Search ................................... 318/327, 341, 345

[56] References Cited
UNITED STATES PATENTS
3,249,839  5/1966  Fay ........................... 318/327
3,366,861  1/1968  Dudler ...................... 318/341
3,414,791  12/1968 Munson ..................... 318/345
3,447,055  5/1969  Mason ....................... 318/345

Primary Examiner—Benjamin Dobeck
Assistant Examiner—Thomas Langer
Attorney—Larson, Taylor and Hinds ABSTRACT: A control circuit for clothes washing and spin-drying machines incorporating a pulse-producing circuit for generating a series of electric current pulses arranged to be applied to the gate of a thyristor for controlling the power supplied to the drive motor through the thyristor, and speed control means for regulating the pulsed output to give a relatively low-motor speed for washing and a relatively higher motor speed for spin drying, together with switch means operable to control the pulse-producing circuit directly to reduce the conduction angle of the thyristor and hence the power supplied to the motor, for example to zero, and so that the return of the switch means to initial condition causes the motor to be first energized in the low-speed condition, irrespective of the condition of the speedcontrol means, so that restarting the motor at full power is avoided.

CONTROL CIRCUITS FOR CLOTHES WASHING AND SPIN-DRYING MACHINES

This invention relates to control circuits for clothes washing and spin-drying machines of the kind in which clothes can be washed in a drum by means of a tumbling action effected by rotating the drum at a relatively low speed about a generally horizontal axis in the presence of a washing liquid and can subsequently be dried by a spinning operation achieved by rotating the drum about the same axis at a comparatively high speed and in particular it relates to control circuits for such machines in which both tumbling and spinning operations are effected by an electric motor operation from an AC supply source, speed control of the motor to provide the different operations being effected by altering the conduction angle of a thyristor placed in series with the motor.

A control circuit for a machine of the kind hereinbefore set forth may include a pulse-producing circuit, whose output to a thyristor gate is variable so as to vary the conduction angle of the thyristor, thus controlling the electrical power supplied to the motor, and a feedback circuit, sensitive e.g. to motor speed and current, selectively connected to the pulse-producing circuit in such a way that, when so connected, the control circuit tends to maintain the motor speed at a first low value, corresponding to the tumbling speed of the clothes drum, and, when disconnected, the motor is supplied with maximum power to accelerate the clothes drum to a second higher spinning speed. The control circuit may also include a program sequence impulse timer controlling connection between the feedback circuit and the pulse-producing circuit, and a mechanically actuated switch in the supply circuit to the motor.

A disadvantage of such a control system is that operation of the impulse timer at intervals of, say, 2 minutes precludes the fine controlling of the duration of spin periods and, in particular, does not allow spin periods of less than 2 minutes duration as is necessary when processing delicate fabrics.

A further disadvantage of this type of control circuit is that in order to effect satisfactory operation of a washing machine using this type of control circuit it is essential to ensure that the system remains energized and hence stabilized, throughout a normal sequence of operations. Thus, for example it is not desireable to switch off the motor by interrupting the mains supply. Moreover an alternative switching operation to deenergize the motor by interrupting an input to the thyristor, although effective, has the disadvantage that restoration of the supply takes place at full power as the conduction angle set by the pulse circuit will be at a maximum as soon as the motor comes to rest. Restarting of the motor at full power inflicts a severe shock load on the washing machine transmission.

An object of the present invention is to provide a control circuit in which these disadvantages are substantially avoided.

According to the present invention in a control circuit for a clothes washing and spin drying machine of the kind hereinbefore set forth, and in which the electric motor is preferably a series wound commutator type electric driving motor, there is provided a first, pulse-producing circuit for generating a series of electric current pulses arranged to be applied to the gate of a thyristor for controlling the conduction angle thereof and hence the power supplied to the motor through the thyristor, a second, feedback circuit for regulating the pulsed output from the control circuit to the thyristor so as to tend to maintain the motor speed at a first, low (washing) speed, and a third, speed control circuit for selectively overriding the feedback circuit so as to tend to increase the motor speed to a second and higher (spin drying) speed, which circuit includes switch means connected to the input of the pulse-producing circuit and operable to control directly the pulse-producing circuit, irrespective of the condition of the feedback and speed control circuits, so as to reduce significantly the conduction angle of the thyristor and hence the power supplied to the motor.

The switch means may, for example, be operable to reduce the conduction angle of the thyristor, and hence the motor speed, to zero. With such an arrangement the return of the switch means to the initial, unoperated, condition will cause the motor to be first energized in the low speed condition, and restarting of the motor at full power is thus avoided. In addition control of the motor is achieved independently of the impulse timer.

In one convenient form of the invention, the switch means comprises a solid state switching circuit connected to the input of the pulse producing circuit and operable to alter the output from the pulse-producing circuit in such a manner as to reduce the conduction angle of the thyristor and hence the motor power input to zero, the energization required for actuation of the solid state switching device being derived from a resistance-capacitance delay line energized simultaneously with a change in motor speed, from low speed to high speed operation under the control of the speed control circuit, the time delay of the resistance capacitance circuit being so selected as to cause deenergization of the motor at a predetermined time after the changeover from low speed to high speed.

The solid state switching circuit may include at least one solid state switching device, such as a transistor, which is normally nonconducting but is rendered conducting by said resistance capacitance delay line after a predetermined time interval following the changeover from low speed to high speed, the pulse producing circuit being responsive to the change in state of the device to the conductive condition to reduce the conduction angle of the thyristor to zero.

Alternatively the switching circuit might include a switching device which is normally conducting but is arranged to be rendered nonconducting by said resistance capacitance delay line, the pulse-producing circuit being responsive to the change in state of the device to the nonconducting condition to reduce the conduction angle of the thyristor to zero.

In another convenient form of the invention, mechanically actuated switching means are connected so as to control an input to the pulse-producing circuit such that when the switching means is closed the drive motor is deenergized, and that when the switch is subsequently opened the output from the pulse circuit increases the conduction angle of the thyristor gradually from zero, smoothly accelerating the motor from rest to a running speed.

Alternatively it can be arranged for the pulse-producing circuit to be deenergized when an associated switch is open, the subsequent closure of the switch causing the output of pulse-producing circuit to increase the conduction angle of the thyristor to increase gradually from zero, so as to smoothly accelerate the motor from rest.

In order that the invention may be more clearly understood, two different embodiments of it as applied to the control of the motor of a washing machine will now be described by way of example with reference to FIGS. 1 and 2 of the accompanying drawings which represent circuit diagrams of the two control circuits.

The machine, which is not itself illustrated in either Figure of the drawings, typically comprises a drum mounted on a shaft in bearings so as to be rotatable on a horizontal axis within a liquid containing cylinder, which is suspended by means of cooperating springs and dampers within an outer cabinet. A series-wound electric drive motor is carried by the liquid containing cylinder and is drivingly connected by means of a *V'V'* or *multi-V belt drive system to a pulley wheel secured to the drum shaft outside the liquid containing cylinder, The system is such that the drum is rotated at a speed below the motor speed and in a fixed relationship of say 1:10 or thereabouts.* Liquid is supplied to the cylinder through an electromagnetically actuated inlet valve and removed by an electric motor driven pump. An electric tubular sheathed wire heating element is mounted in the cylinder for heating the wash liquid.

The various functions of the washing machine are sequentially controlled by a program controller comprising a asynchronous electric timer motor actuating, via a stepping linkage, a number of switch operating cams the switches controlling the supply of electrical power to the various parts of the machine in sequence so as to cause a particular program of operations to be performed on clothes placed in the drum and a solid state switching circuit, also controlled by the timer motor for the drive motor of the machine.

With reference now to FIG. 1, which shows the first control circuit for the washing machine, the drum of the washing machine (not shown) is rotatably driven by a series wound electric motor 1. The machine is connected to a source of AC supply through a main isolating switch, (not shown) the motor being supplied through a thyristor 2 and a low value resistor 3. A diode 4 connected in parallel with the motor acts as a flywheel diode in known manner to provide a smoothing effect on the motor current supply.

The thyristor 2 is fired by a pulse producing circuit (indicated by chain dotted lines A) whose output (to the thyristor) is controlled by a negative feedback circuit $B_1$ sensitive to rising motor speed, a positive feedback circuit $B_2$ sensitive to rising motor current, a speed control switch C and a solid state relay circuit D, these control circuits acting to regulate the pulses produced by circuit A, and hence the pulses of DC power supplied to the motor from the thyristor.

The speed control switch C is actuated, when required, by means of a cam in the program controller driven by a synchronous motor 6. The motor 6 also determines the condition of other cam actuated switches 7 and 8 in the electrical supply to a heater 9 and a pump motor 10 respectively. A switch 41 is also controlled by a cam, actuated by the program controller, this switch, when closed, cuts off the supply of power to the motor irrespective of the conditions existing at the time in the control circuits B, C and D. The function of this switch will be more fully described hereinafter.

A further cam-actuated changeover switch 29 is arranged to reverse position at regular intervals through the washing action in order to periodically reverse the drive motor, and hence the wash drum, and thus provide a tumbling action on the clothes within the drum. The switch 41 is closed momentarily at each reversal to cut off the motor power and prevent arcing in switch 29.

In operation of the washing machine its various functions are sequentially controlled by the program controller which may be set to select one of several washing sequences to suit the clothes being processed. A complete washing and drying cycle may, for example, comprise the following steps:

Prewash, spin, wash, spin, rinse and spin.

During the prewash, wash and rinse functions the drum is rotated at low speeds (say 50 rev./min.) in one direction for a short period of time (say 15 seconds) and then rotated in the opposite direction for an equal period of time. Since the speed of rotation during these operations is low, the centrifugal force on the clothes is not sufficient to hold them in contact with the wall of the drum as they are carried round and as a result they tumble within the drum.

The spin action is achieved by rotating the drum at a high speed (say 1,000 rev./min.) in one direction only, the centrifugal force on the clothes being sufficiently large to retain them in contact with the wall of the drum and to extract any contained liquid from them.

The low speed of rotation of the drum is determined by the pulse producing circuit A and the feedback circuits $B_1$ and $B_2$, the switch C being open at this time. Thus, the circuits A, $B_1$ and $B_2$ are set so as to maintain the motor speed at substantially 500 rev./min., corresponding to a drum speed of 50 rev./min. irrespective of normal variations in load on the motor.

The pulse producing circuit A comprises, essentially, a capacitor 12 transistors 13 and 14 and a zener diode 15 all supplied with low voltage DC by means of a voltage dropping resistor 61 and a zener diode 17 and arranged so that the circuit is supplied with a pulse of approximately rectangular form during each positive half cycle of the AC supply, the negative half-cycle being suppressed by the zener diode 17. During each half-cycle the capacitor 12 becomes charged through the transistor 14 which is conductive at this time due to the voltage at its emitter being below that at its base (this base voltage being supplied by potential dividing resistors 33 and 34) but being below the voltage of the zener diode 15. When the voltage across this capacitor becomes large enough, the base current in transistor 13 turns on the transistor. The transistor 13 then supplies base current to transistor 14, turning it on so as to supply more base current to transistor 13. This cumulative action leads to rapid saturation of these transistors with the result that the voltage of the zener diode 15 is exceeded and a further capacitor 32 discharges through the saturated transistors into the gate of the thyristor 2. As a result the thyristor switches on, supplying the motor with a pulse of DC power.

Regulations of the pulses applied to the thyristor for controlling the conduction angle thereof is effected by varying the voltage at the base of the transistor 19. As this voltage rises, the rate of charge of the capacitor 12 decreases with the result that the firing pulse to the gate of the thyristor is delayed until later in the half-cycle and the conduction angle of the supply to the drive motor is thereby decreased.

The voltage at the base of the transistor 19 is controlled by the feedback circuits $B_1$ and $B_2$.

The negative feedback circuits $B_1$ comprises a tachogenerator 18 (connected to the driving motor 1) which applies a voltage, increasing with motor speed, to the base of the transistor 19. As the voltage applied to the base of transistor 19 increases, the power supplied to the motor, and hence the motor speed, decreases. The input of this negative feedback circuit $B_1$ is supplied from a reference voltage determined by the output voltage of the positive feedback circuit $B_2$.

The circuit $B_2$ comprises resistors 3 and 20 and a capacitor 21, the arrangement being such that as the motor load, and hence the current required, increases, the potential across the resistor 3 will increase causing the reference voltage at the input to circuit $B_1$ with respect to the common rail to decrease and hence the control voltage to the transistor 19 to decrease so that the power input to the motor increases to maintain the motor speed.

A preset variable resistor 22 controls the gain of the transistor pair 19 and 14 hence the response of the pulse circuit A to the feedback circuits $B_1$ and $B_2$, the value being selected so as to maintain the motor speed at 500 rev./min. at this time.

AT the end of a washing (or rinsing) period the timer motor 6 closes the switch 8 so as to energize the electric motor driven pump 10 to remove all the free washing liquid from the machine. Simultaneously the timer closes the switch C to cause the motor to accelerate to a high speed to provide a higher spinning speed for the clothes drum. Thus, closure of the switch C reduces the reference voltage applied at the input of the tachogenerator and hence the voltage applied to the base of the transistor 19 to zero. As a result of this the conduction angle set by the pulses from the pulse-producing circuit to the thyristor increases to the maximum possible value and the motor speed rises rapidly. Simultaneously (with the closure of the switch C) the voltage applied to a zener diode 42 in the spin timer circuit D is reduced, thus increasing the voltage across it and causing it to conduct. A switching transistor 43 is switched off at this time by virtue of a biasing voltage between its emitter and base due to a potential dividing circuit comprising resistors 47 and 48 and the uncharged capacitor 44, respectively. As soon as a conductive path is established through the zener diode the capacitor 44 commences to charge through a resistor 45 and the zener diode 42, a diode 46 being provided to prevent the capacitor discharging during alternate cycles of the supply. The base potential at transistor 43 thus decreases as the charge in capacitor 43 rises until, at a fixed time thereafter, it is below the bias potential present at the emitter of this transistor. When this change occurs the emitter base junction of the transistor becomes forwardly biassed, i.e. turned on, with the result that it becomes highly conductive between its collector and its emitter so that the voltage applied to the base of transistor 19 is raised substantially to switch this transistor hard on and entirely suppress the production of pulses from the circuit A to the thyristor 2, by turning the transistor 14 off, with the result that the drive motor is deenergized, and remains in this condition until the switch C is again opened by timer motor 6. The charging rate of capacitor 44 is selected to provide the required spin duration.

When the switch C is opened, the voltage across the zener diode 42 decreases so that the zener reverts to its nonconducting condition. The capacitor is now able to discharge through a high value resistor 49. The transistor 43 switches off as the voltage at its base rises above that at its emitter and thus the base voltage of transistor 19 decreases to a value determined by the output from the feedback circuits $B_1$ and $B_2$, this output corresponding to the maximum power requirement for the motor. The pulse circuit, when reenergized in this way through transistor 19, produces and feeds to the thyristor pulses of rapidly increasing conduction angle such that the motor smoothly accelerates from rest to the desired running speed, in this case 500 rev./min., whereupon the increasing input voltage generated by the feedback circuits and supplied to the base of transistor 19 prevents any further motor speed increase.

It is convenient to provide a second mechanically actuated switch 41 in parallel with the transistor switch 43 and actuated by the program timer such that closure of this switch turns the transistor 19 hard on to suppress the production of pulses from the circuit A so as to deenergize the motor at whichever point in the program may be desirable, e.g. between motor reversals during a washing operation. In this way shock loads on the machine transmission are reduced and the subsequent restarting of the motor on opening the switch 41 occurs as set out previously.

It should be appreciated that, although in this embodiment the control circuit provides a spinning operation of fixed duration, the invention is equally applicable to a circuit in which the duration of the spinning operation is adjustable by e.g. varying the values of the capacitor 44 or the resistor 45.

It will also be appreciated that the invention is applicable to other forms of circuit arrangements incorporating a pulse-producing circuit for generating a series of electric pulses applied to the thyristor for varying the conduction angle of the latter and hence the power supplied to the motor, together with a feedback circuit for maintaining the motor speed at a first low washing speed, and speed control means for selectively overriding the feedback circuit so as to tend to increase the motor speed to a higher spin drying speed.

Figure 2:
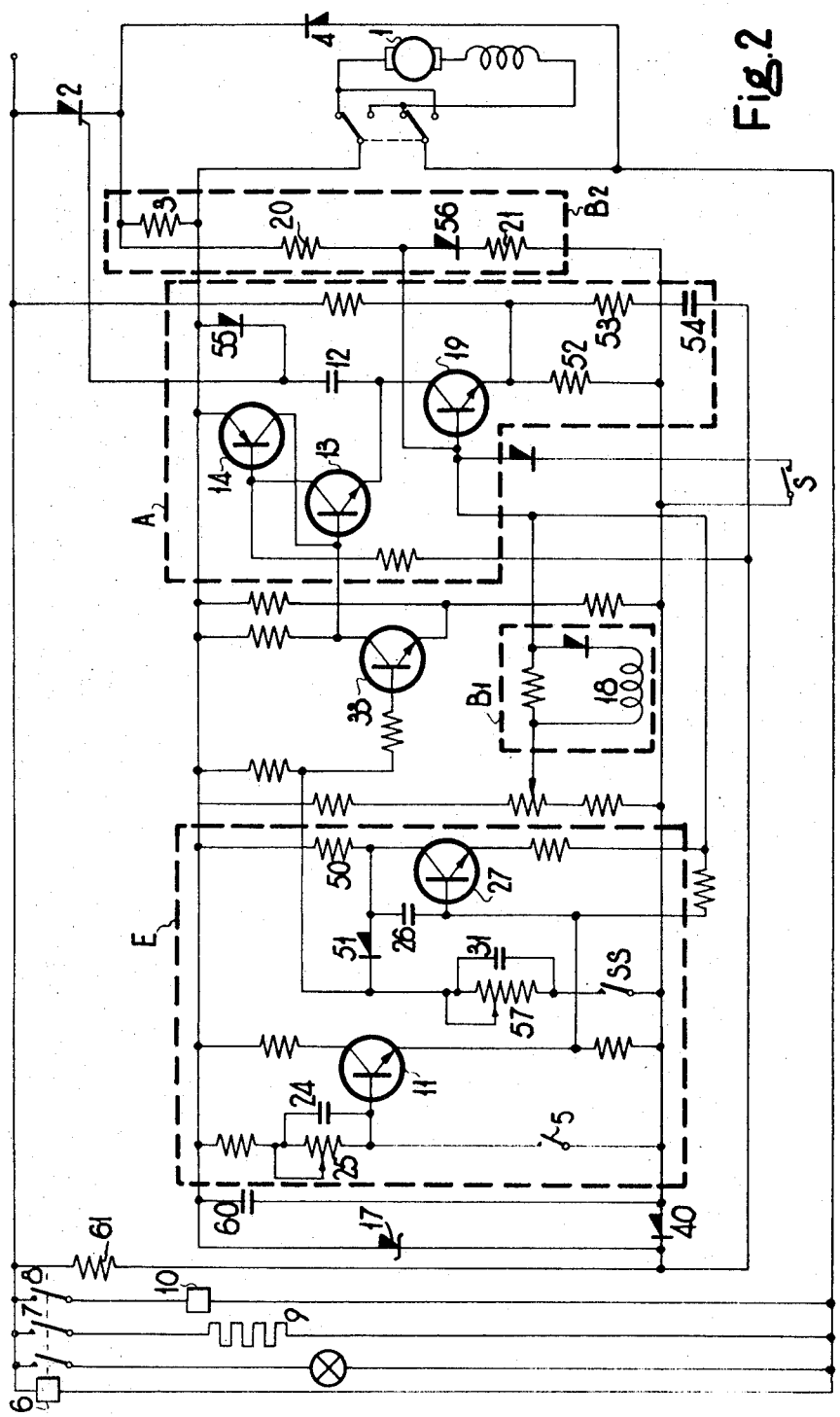

Thus referring now to FIG. 2, which illustrates the second embodiment of the invention, the washing machine motor 1 is similarly supplied with power through a thyristor 2 and resistor 3, and the conduction angle of the thyristor is controlled by a pulse producing circuit A which is controlled in turn by a negative feedback circuit $B_1$ sensitive to rising motor speed, and a positive feedback circuit $B_2$ sensitive to rising motor current, these circuits acting to maintain the motor speed at substantially 500 rev./min. for washing and rinsing, and the operation of the machine and its various functions being similarly controlled by a program controller capable of being set to select one of an appropriate number of washing sequences. Overriding of the feedback circuits to accelerate the motor 1 to a spin-drying speed is achieved by a solid state time dependent circuit E as will be subsequently described.

In this embodiment the circuits A, $B_1$, $B_2$ are supplied with low voltage DC by means of a voltage dropping resistance 61, a diode 40 a smoothing capacitor 60 and a zener diode 17.

The pulse producing circuit A comprises, essentially a capacitor 12, a complementary pair of transistors 13 and 14, a further transistor 19 and a differentiating circuit comprising resistor 53 and a further capacitor 54. In use the differentiating circuit is supplied with a voltage of approximately square wave form. During each positive half-cycle of the square wave the capacitor 12 becomes charged via diode 55 at a rate dependent upon the voltage applied to the base of the transistor 19 and the value of the resistor 52, the transistor 19 being conductive at this time, due to the voltage at its emitter being below that at its base, this base voltage being normally made up of an adjustable reference voltage derived from a potentiometer network P and modified by the two feed back circuits $B_1$ and $B_2$, as will subsequently be described.

When the voltage across the capacitor 12 becomes large enough, this will cause the transistor 13 to conduct. The transistor 13 then supplies base current to transistor 14 turning it on so as to supply more base current to transistor 13. This cumulative action leads to rapid saturation of these transistors with the result that the lower end of capacitor 12 is effectively connected to the H.T. rail via transistors 13 and 14, resulting in a voltage pulse which is now positive with respect to the H.T. rail being applied to the gate of the thyristor 2. Diode 55 now prevents capacitor 12 from short circuiting directly through transistors 13 and 14 and as a result the thyristor switches on, supplying the motor with a pulse of DC power.

Control of the conduction angle of the motor current wave form is effected by varying the rate at which capacitor 12 charges which is in turn affected by varying the voltage at the base of the transistor 19. As this voltage rises the rate of charge of the capacitor 12 increases, with the result that the firing pulse to the gate of the thyristor is applied earlier in the half-cycle with the result that the conduction angle of the supply to the drive motor is increased giving a faster motor speed.

Similarly if the rate of the charge of the capacitor 12 decreases as a result of the base voltage of the transistor 19 being reduced the firing pulse to the gate of the thyristor is applied later in the half-cycle causing the conduction angle of the supply to the drive motor being decreased and reducing the motor speed.

As previously pointed out the voltage at the base of the transistor 19 is controlled by the feedback circuits $B_1$ and $B_2$.

The negative feedback circuits $B_1$ comprises a tachogenerator 18 (mechanically connected to the driving motor 1) which applies a voltage, decreasing with increasing motor speed, to the base of a transistor 19. As the voltage applied to the base of transistor 19 decreases the power supplied to the motor and hence the motor speed decreases.

The positive feedback circuit $B_2$ comprises resistors 3, 20 and 21 and diode 56, the arrangement being such that as the motor load, and hence the current required for the motor, increases, the positive feedback voltage applied to the base of the transistor 19 also increases so that the power input to the motor increases to maintain the motor speed.

THe feedback circuits $B_1$ and $B_2$, and the value of the reference voltage are chosen so as to maintain the motor speed at approximately 500 rev./min. at this time i.e. with circuit E isolated.

At the end of a washing (or rinsing) period the timer motor 6 closes the switch 8 so as to energize the electric motor driven pump 10 to remove all the free washing liquid from the machine. Simultaneously the timer opens switch 5 which controls the time dependent circuit E. When switch 5 is opened a capacitor 24, (suitably 250 microfarads) commences to discharge through a high value adjustable resistor 25 (suitably 0 to 300 K). As a result the voltage at the base of the transistor 11 increases slowly over a period of time (which can be determined by adjustment of the high value resistor 25) and may for example be on the order of 30 seconds. The transistor 11 is then switched on and thereafter the current through the transistor (from collector to emitter) increases slowly thus increasing the control voltage applied at the base of transistor 19 overriding the feedback circuits so that the motor speed, and hence the drum speed, slowly increases.

During this slow acceleration from washing speed the centrifugal force on the clothes gradually increases until exceeds the gravitational force on the clothes. This gradual increase in speed has the effect of slowly moving the clothes outward to contact the wall of the drum in a balanced manner.

As a transistor 11 becomes more conductive the voltage at the base of a further transistor 27 rises this causing the transistor 19 to rise rapidly to a maximum determined by the transistor 27 reaching a stable conducting condition.

As this base current further increases the transistor 19 turns on harder more rapidly, the conduction angle of the rectified supply to the motor similarly increasing rapidly to its maximum, and the motor is supplied with maximum power and rapidly accelerates the clothes drum to high spin drying speed. The capacitor and resistor values can readily be selected, in dependence upon the transistors employed, to obtain the appropriate time intervals.

During the slow acceleration period and with the switch SS closed a capacitor 31 charges up via a resistor 50 and diode 51. When transistor 27 breaks over the voltage at its collector decreases and diode 51 is now reverse biassed thus preventing further charge to capacitor 31 (suitably 250 microfarads). Capacitor 31 now discharges via variable resistor 57 (suitably 0 to 300 K) over a period of time (e.g. 15 seconds) preset by the variable resistor 57.

As capacitor 31 discharges the voltage at the junction of diode 51 capacitor 31 and variable resistor 57 decreases and a point is reached when transistor 33 turns off. The voltage at the collector of transistor 33 increases and since this is connected to the base of the transistor 13 in the pulse producing circuit A the latter will be prevented from firing and hence will prevent the application of a firing pulse to the thyristor 2, thus terminating the spinning operation.

If the switch SS is opened prior to the commencement of the sequence of operations capacitor 31 is prevented from charging and the drum will continue to be driven at spin drying speed. The spinning operation may in such a case be terminated by closure of a further switch which reduces the voltage at the base of the transistor 19 to a value such that it switches off, thereby suppressing the pulses and reducing the conduction angle of the thyristor 2 to zero. This closure of the switch S can be arranged to take place under the control of the timer to give a longer spin drying time than is provided for the charging of the capacitor 31.

I claim:

1. A control arrangement for an automatic clothes washing and spin drying machine of the kind designed to carry out a programmed sequence of operations and incorporating a drum rotatable about a horizontal axis, said arrangement comprising an electric motor for driving the drum energizable from an alternating current supply through a thyristor, and a control circuit for altering the conduction angle of the thyristor to cause the motor to rotate at a relatively low speed for washing and a comparatively high speed for spin drying, said control circuit comprising a first, pulse-producing circuit for applying a series of electric current pulses for application to the gate of the thyristor to control the conduction angle thereof and hence control the power supplied to the motor through the thyristor, a second, feedback circuit for regulating the output from the control circuit so as to tend to maintain the motor speed at a first, low speed, and a third, speed control circuit for selectively overriding the feedback circuit so as to tend to increase the motor speed to a second and higher speed, the control circuit further including switch means connected to an input of the pulse-producing circuit for directly controlling the pulse-producing circuit, said switch means, when operable, overriding the feedback and speed-control circuits such that the conduction angle of the thyristor, and hence the power supplied to the motor, is significantly reduced and causing, upon subsequent return to the initial state thereof, a gradual increase in the conduction angle of the thyristor from the reduced value to a value determined by the feedback and speed-control circuits.

2. A control arrangement according to claim 1, wherein the switch means comprises a solid state switching circuit connected to the input of the pulse producing circuit and operable to alter the output from the pulse-producing circuit in such a manner as to reduce the conduction angle of the thyristor and hence the motor power input to zero.

3. A control arrangement according to claim 2, wherein the energization required for actuation of the solid state switching device is derived from a resistance-capacitance delay line energized simultaneously with a change in motor speed from low speed to high speed operation under the control of the speed control circuit, the time delay of the resistance capacitance circuit being so selected as to cause deenergization of the motor at a predetermined time after the changeover from low speed to high speed.

4. A control arrangement according to claim 3, wherein the solid state switching circuit includes at least one solid state switching device, which is normally nonconducting but is rendered conducting by said resistance capacitance delay line after a predetermined time interval following the changeover from low speed to high speed, the pulse producing circuit being responsive to the change in state of the device to the conductive condition to reduce the conduction angle of the thyristor to zero.

5. A control arrangement according to claim 3, wherein the solid state switching circuit includes a solid state switching device which is normally conducting but is arranged to be rendered nonconducting by said resistance capacitance delay line after a predetermined time interval following the changeover from low speed to high speed, the pulse-producing circuit being responsive to the change in state of the device to the nonconducting condition to reduce the conduction angle of the thyristor to zero.

6. A control arrangement according to claim 1, wherein the switching means comprises a mechanically actuated switch connected so as to control an input to the pulse-producing circuit such that when the switching means is closed the drive motor is deenergized, and that when the switch is subsequently opened the output from the pulse circuit increases the conduction angle of the thyristor gradually from zero, smoothly accelerating the motor from rest to a running speed.

7. A control arrangement according to claim 1 wherein the switching means comprises a mechanically actuated switch connected to the input of the pulse-producing circuit so that when the switch is open the drive motor is deenergized, but such that when the switch is subsequently closed the output from the pulse circuit increases the conduction angle of the thyristor gradually from zero, smoothly accelerating the motor from rest to a running speed.

8. A control arrangement according to claim 1, wherein the pulse-producing circuit includes a capacitor, means for charging the capacitor during appropriate half-cycles of the supply voltage at a rate dependent upon feedback and speed control circuits, and means responsive to the charge on the capacitor for generating a pulse when the charge on the capacitor reaches a predetermined value, the rate of charge of the capacitor being determined by the degree of conductivity of a transistor, and the said switch means being operable to change the conductivity of the transistor by an amount sufficient to suppress the pulses and hence reduce the power supplied to the motor to zero.

* * * * *